(12) United States Patent
Kaplan et al.

(10) Patent No.: US 7,944,678 B2
(45) Date of Patent: May 17, 2011

(54) LOW VOLTAGE POWER SUPPLY FOR SPARK IGNITER AND FLAME SENSE

(75) Inventors: Yelena N. Kaplan, Columbus, OH (US); Dale Thomas Rodda, Marysville, OH (US)

(73) Assignee: Robertshaw Controls Company, Carol Stream, IL (US)

( * ) Notice: Subject to any disclaimer, the term of this patent is extended or adjusted under 35 U.S.C. 154(b) by 323 days.

(21) Appl. No.: 12/208,856

(22) Filed: Sep. 11, 2008

(65) Prior Publication Data

US 2010/0061034 A1 Mar. 11, 2010

(51) Int. Cl.
*F23Q 3/00* (2006.01)
(52) U.S. Cl. .................... 361/253; 361/256; 361/263
(58) Field of Classification Search .................. 361/253, 361/256, 263, 268; 315/209 T, 209 CD, 315/209 SC; 431/46, 71, 78
See application file for complete search history.

(56) References Cited

U.S. PATENT DOCUMENTS

| | | | |
|---|---|---|---|
| 3,902,839 A | | 9/1975 | Matthews |
| 3,938,940 A | * | 2/1976 | Bauer ............... 431/79 |
| 4,087,229 A | | 5/1978 | Teichert et al. |
| 4,143,303 A | | 3/1979 | Goble et al. |
| 4,145,180 A | * | 3/1979 | Bendorf ............. 431/46 |
| 4,303,385 A | | 12/1981 | Rudich et al. |
| 4,521,180 A | | 6/1985 | Walter et al. |
| 4,565,519 A | * | 1/1986 | Carignan ............ 431/46 |
| 4,626,193 A | * | 12/1986 | Gann ............... 431/71 |
| 4,717,333 A | | 1/1988 | Carignan |
| 5,224,015 A | * | 6/1993 | Balland ............ 361/256 |
| 5,472,336 A | | 12/1995 | Adams et al. |
| 5,506,478 A | * | 4/1996 | Daetz ............... 315/209 T |
| 5,506,569 A | | 4/1996 | Rowlette |
| 5,636,978 A | | 6/1997 | Sasaki |
| 5,655,900 A | | 8/1997 | Cacciatore |
| 5,857,845 A | | 1/1999 | Paciorek |
| 5,957,679 A | | 9/1999 | Cacciatore |
| 6,247,921 B1 | | 6/2001 | Helt |

FOREIGN PATENT DOCUMENTS

| | | |
|---|---|---|
| CN | 101000147 A | 7/2007 |
| EP | 0 821 198 A1 | 1/1998 |
| JP | 55017021 A | 2/1980 |
| JP | 57182024 A | 11/1982 |
| JP | 60174424 A | 9/1985 |
| JP | 6107833 A | 1/1986 |
| JP | 62102032 A | 5/1987 |
| JP | 63226525 A | 9/1988 |
| JP | 7117241 B | 12/1995 |
| JP | 8190805 A | 7/1996 |
| KR | 50010469 B1 | 9/1995 |
| KR | 1008978 A | 11/2007 |

* cited by examiner

*Primary Examiner* — Patrick Salce
(74) *Attorney, Agent, or Firm* — Reinhart Boerner Van Deuren P.C.

(57) ABSTRACT

A low voltage power supply circuit for intermittent pilot and/or direct spark ignition systems utilized in gas burning appliances is provided. The circuit utilizes a single transformer and a resonant circuit to supply power to both a flame sense circuit as well as the spark generation circuit. The resonant circuit allows the use of low power sources such as batteries or self-supplied voltage systems such as thermopiles or hydro generators. Recognizing that power draw from the low power source is high during a sparking event and recharging of a sparking capacitor, the flame sensing is suspended during the sparking event and for a short recharge time thereafter.

20 Claims, 1 Drawing Sheet

LOW VOLTAGE POWER SUPPLY FOR SPARK IGNITER AND FLAME SENSE

FIELD OF THE INVENTION

This invention generally relates to ignition and flame sense systems for intermittent pilot and direct spark ignition systems for gas burners, and more particularly to power supply circuitry for such intermittent pilot and direct spark ignition systems utilizing low power or self-powered sources.

BACKGROUND OF THE INVENTION

Spark ignition systems, such as those used in igniting a pilot flame for gas fired water heaters, space heaters and furnaces are increasingly utilizing intermittent pilot or direct spark ignition systems, which do not use a standing pilot. These intermittent pilots most commonly use a flame sensing circuit to detect the presence of a flame before allowing the opening of the main gas valve that supplies the main burner to avoid unconsumed fuels from flowing freely.

The problem with the state of the art in intermittent pilot and direct spark ignition systems, i.e. systems that do not use a standing pilot flame, is that many of them use large or complex circuits to generate a high energy spark, which require higher voltage power supplies. The complexity of such power supply circuits increases dramatically for applications that need to operate on low voltage sources, such as battery power or self-powered implementations via a thermopile or hydro generator. Such circuitry often requires a substantial number of components which drive the cost of such circuitry unacceptably high.

In view of the highly competitive nature of the appliance industry, there is a need in the art for power supply circuitry that allows the use of low voltage sources, e.g. batteries, thermopile, hydro generator, etc., without increasing the cost and complexity of such circuitry to unacceptable levels. Embodiments of the present invention provides such a low voltage power supply for spark igniter and flame sense circuits for gas burners used in intermittent pilot and direct spark ignition systems. These and other advantages of the invention, as well as additional inventive features, will be apparent from the description of the invention provided herein.

BRIEF SUMMARY OF THE INVENTION

In view of the above, embodiments of the present invention provide a new and improved power supply circuit that overcomes one or more of the problems existing in the art. More particularly, embodiments of the present invention provide a new and improved power supply circuit for intermittent pilot and/or direct spark ignition systems. Still more particularly, embodiments of the present invention provide a new and improved power supply circuit for intermittent pilot and/or direct spark ignition systems that allow the use of low voltage sources, e.g. batteries or self-supplied voltage systems such as thermopile or hydro generators.

In one embodiment of the present invention, the power supply circuit includes only one transformer with a specified resonant frequency to reduce power consumption. With the power consumption reduced, the ability to use low voltage power supplies such as batteries, or self-supplied voltage systems such as a thermopile or a hydro generator, presents itself. In addition, production costs are kept down due to the decrease in parts used to produce the circuits.

In one specific embodiment, the power supply circuit provides a high-voltage alternating current (AC) supply to flame sense circuit and spark ignition circuit. The flame sense circuit utilizes the property of flame rectification, which occurs when a flame bridges two asymmetrically sized electrodes that are energized by the source of alternating current (AC). In this embodiment, the power supply circuit utilizes the resonant property of an inductor-capacitor circuit. Low voltage from a voltage source, e.g., a battery, is supplied through a filter circuit that includes an inductor and capacitor. The primary coil of a transformer and the capacitor form a resonant circuit, wherein the resonant frequency of the circuit is defined by values of inductance and capacitance. A switching device is controlled by a control circuit which generates, in this embodiment, a PWM switching signal with a frequency set to the resonant frequency of the circuit. Preferably, the duty cycle is low to further reduce a power consumption of the circuit.

In another embodiment, the control circuit utilizes the high-pass filter of the gate of switching device to protect the switching device in case the control circuit outputs a DC signal or lower frequency switching pulse. This allows the use of a smaller switching device since it will not be in an ON condition for any considerable time with low duty cycle on the gate.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
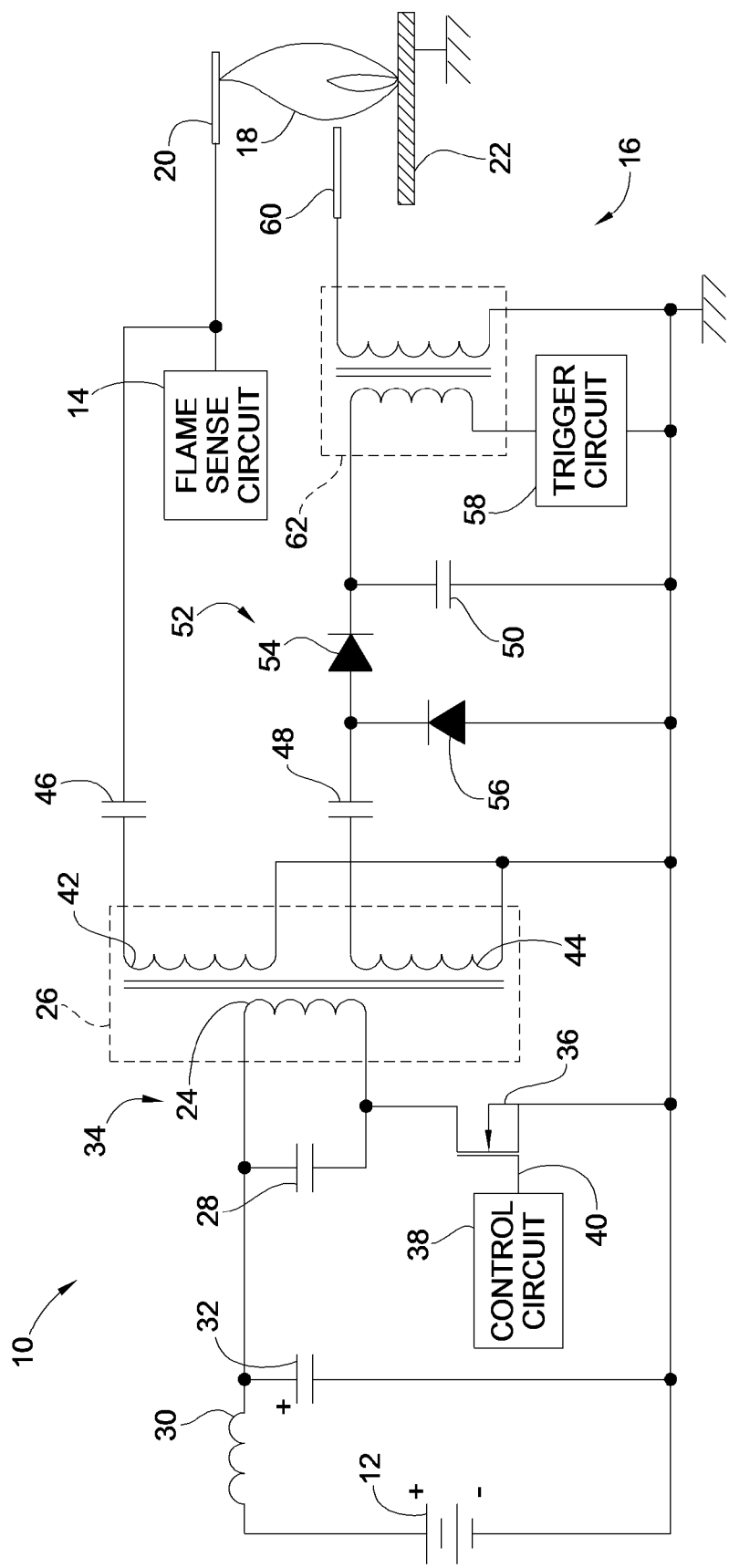
FIG. 1 is a simplified schematic diagram of an embodiment of a power supply circuit for intermittent pilot and/or direct spark ignition systems constructed in accordance with the teachings of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to FIG. 1, wherein is illustrated one embodiment of a low voltage power supply circuit 10 for intermittent pilot and/or direct spark ignition systems utilized in gas burning appliances constructed in accordance with the teachings of the present invention. It should be noted at the outset, however, that while the following description will describe features of this embodiment as applied to an operative environment in which it finds particular applicability, such description and embodiment should be taken by way of example only, and not by way of limitation. Other embodiments of the present invention and other operative environments are within the scope of the present invention and their full scope is specifically reserved herein.

As shown in FIG. 1, the power supply circuit 10 utilizes a low voltage source of electric power, e.g. battery 12, to provide a high-voltage alternating current (AC) supply to flame sense circuit 14 and spark ignition circuit 16. In this embodiment, the flame sense circuit 14 may be constructed in accordance with flame sense circuits known in the art that utilize the property of flame rectification, which occurs when a flame 18 bridges two asymmetrically sized electrodes 20 and 22 that are energized by a source of alternating current (AC), the generation of which will be described more fully below. In one embodiment of the present invention, the output from the flame sense circuit 14 is coupled to the control circuit 38 (connection not shown to simplify the schematic of FIG. 1), or to another controller (not shown) that is used to control the ignition event and the gas supply valves (not shown) for the gas burning appliance.

In the illustrated embodiment, the low voltage from the battery 12 is supplied through a filter circuit constructed from inductor 30 and capacitor 32. This filtered voltage is then supplied to a resonant circuit 34, formed in this embodiment from the primary coil 24 of transformer 26 and capacitor 28. The resonant frequency of this circuit 34 is defined by values of inductance of the primary coil 24 and capacitance of the capacitor 28.

The switching of an electronic switch 36, e.g. an N-channel MOSFET, is enabled by control circuit 38. In one embodiment, this control circuit 38 is a microprocessor that outputs a pulse width modulated (PWM) control signal to the switch 36 having a frequency set approximately equal to the resonant frequency of the resonant circuit 34. The duty cycle of the PWM control signal is low, e.g. approximately 1% to approximately 15% in one embodiment. With such a switching control and due to characteristics of resonant circuit 34, most of the energy is flowing inside the resonant tank formed by primary coil 24 and capacitor 28, with little energy from supply battery 12 to support oscillation.

In an embodiment of the present invention wherein the switch 36 is an N-channel MOSFET, the high-pass filter of the gate 40 of the N-channel MOSFET provides protection for the MOSFET (switch 36) in the case of failure of the control circuit 38 wherein it outputs a DC signal or a lower frequency PWM signal. Because of this internal configuration of the N-channel MOSFET and the protection that it provides in this implementation, a smaller switch 36 may be used since it will not be on for any considerable time with the low duty cycle on the gate 40.

When the resonant circuit 34 on the primary side of transformer 26 is oscillating, the energy transfers to the secondary coils 42 and 44 of the transformer 26. In the illustrated embodiment, the coils 42, 44 are identical, although other embodiments may utilize coils 42, 44 that are not identical depending on the need and configuration of the flame sense circuit 14 and the spark ignition circuit 16. The turns ratio of the transformer 26 is chosen to accommodate for the wide voltage range of the low-voltage source, e.g. battery 12, on the primary side. For example, in embodiments that utilize an unregulated battery 12 voltage supply, the voltage variation can be as much as two times over the life of the battery 12. While not so limited, the turns ratio of the transformer 26 illustrated in FIG. 1 has a turns ratio of approximately 1:66 when the battery 12 is a 2-cell battery supply. In another embodiment having even further reduced power consumption for use with a 3-cell battery supply, the transformer 26 utilizes only a single secondary coil from which capacitors 46 and 48 are supplied and has a turns ratio of approximately 1:19.

During operation of the circuit 10, AC voltage at the secondary coil 42, coupled through capacitor 46, is applied to the flame sensing electrode 20 to be used in the flame sense circuit 14 utilizing a flame rectification method. Flame sense circuit 14 may be JFET-based or analog as known in the art.

The AC voltage at the secondary coil 44 is used to charge a capacitor 50 through a voltage doubler circuit 52 that includes capacitor 48 and rectifier diodes 54 and 56. In this embodiment, the spark trigger circuit 58 utilizes an SCR with the gate triggered by the control circuit 38 (connection not shown to simplify the schematic of FIG. 1), e.g. a microprocessor that controls the ignition logic as well as the power supply control signals. In other words, the control circuit 38 may also include the control logic that triggers the spark from the spark electrode 60 coupled to the step up transformer 62 when the pilot gas valve (not shown) is commanded opened. Other embodiments, however, may utilize a separate controller, e.g. the gas valve controller if a separate one exists, to enable the trigger circuit 58 to generate the spark.

During a sparking event and for a short period thereafter, the voltage on the flame sense circuit 14 from the coil 42 will be very low due to spark triggering and initial capacitor 50 charging time because of the load on the secondary coil 44 drawn for these events. As such, in one embodiment of the present invention, the sensing of the flame sense circuit 14 is suspended for a short period during and after the triggering of the trigger circuit 58 to allow for this transient condition to pass. In one embodiment, the flame sense circuit 14 is not affected by the absence of the flame signal for, e.g., 50 ms to 100 ms. In other embodiments, the flame sense circuit 14 is not read during the sparking event and for a period thereafter until the capacitor 50 is recharged.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A power supply circuit for use with intermittent pilot and direct spark ignition systems for gas burners, comprising:
   a low voltage DC power source;
   a resonant circuit coupled to the power source, the resonant circuit including as an inductive element thereof a primary coil of a transformer;
   an electronic switching circuit coupled in series with the resonant circuit;
   a control circuit operatively coupled to the switching circuit to control switching thereof, the control circuit utilizing a low duty cycle control signal to control switching of the switching circuit; and
   wherein the transformer includes a first secondary coil coupled to a flame sense electrode and flame sense circuit; and
   wherein the transformer includes a second secondary coil coupled through a voltage doubler circuit to a spark capacitor in parallel with a primary coil of a step-up transformer and trigger circuit, the secondary coil of the step-up transformer being coupled to a spark electrode.

2. The power supply circuit of claim 1, wherein the control circuit generates a pulse width modulated (PWM) control signal to control switching of the switching circuit.

3. The power supply circuit of claim 2, wherein the duty cycle of the control signal is between about 1% to about 15%.

4. The power supply circuit of claim 1, wherein the control signal has a frequency approximately equal to a resonant frequency of the resonant circuit.

5. The power supply circuit of claim 1, wherein the switching circuit is an N-channel MOSFET.

6. The power supply circuit of claim 1, further comprising a filter circuit coupled between the power source and the resonant circuit.

7. The power supply circuit of claim 1, wherein the trigger circuit is an SCR having a gate coupled to the control circuit.

8. The power supply circuit of claim 1, wherein the control circuit is operatively coupled to the flame sense circuit to read an output thereof, and wherein the control circuit does not read the flame sense circuit during a sparking event.

9. The power supply circuit of claim 8, wherein the control circuit does not read the flame sense circuit for a predetermined period following the sparking event.

10. The power supply circuit of claim 9, wherein the predetermined period is approximately 50 ms.

11. The power supply circuit of claim 9, wherein the predetermined period is between approximately 50 ms and 100 ms.

12. The power supply circuit of claim 9, wherein the predetermined period is set to allow recharging of the spark capacitor after the sparking event.

13. The power supply circuit of claim 1, wherein the first secondary coil and the second secondary coil of the transformer are identical.

14. The power supply of claim 1, wherein the low voltage DC power source is a battery.

15. The power supply of claim 1, wherein the low voltage DC power source is a thermopile.

16. The power supply of claim 1, wherein the low voltage DC power source is a hydro generator.

17. A power supply circuit for use with intermittent pilot and direct spark ignition systems for gas burners powered from a low voltage DC power source, comprising:
   an input filter circuit adapted to receive low voltage DC;
   a transformer having coupled in parallel with a primary coil thereof a capacitor to form a resonant circuit;
   a switching circuit operatively coupled to the resonant circuit to induce resonance therein;
   wherein the transformer includes a first secondary coil configured to power a flame sense circuit utilizing flame rectification to detect the presence of flame; and
   wherein the transformer includes a second secondary coil coupled to a spark capacitor, the spark capacitor being coupled to a primary coil of a step-up transformer and trigger circuit, the secondary coil of the step-up transformer configured to drive a spark electrode of an intermittent pilot or direct spark ignition system.

18. The power supply circuit of claim 17, further comprising a control circuit operatively coupled to the switching circuit and configured to generate a low duty cycle pulse width modulated (PWM) signal to drive the switching circuit.

19. The power supply circuit of claim 18, wherein a frequency of the PWM signal is approximately equal to a resonant frequency of the resonant circuit.

20. The power supply circuit of claim 17, further comprising a voltage doubler circuit interposed between the second secondary coil and the spark capacitor.

* * * * *